March 14, 1967     H. E. WINFIELD, JR     3,308,632
ICE MAKER WITH DOOR MOUNTED BIN
Filed Dec. 28, 1964     2 Sheets-Sheet 2

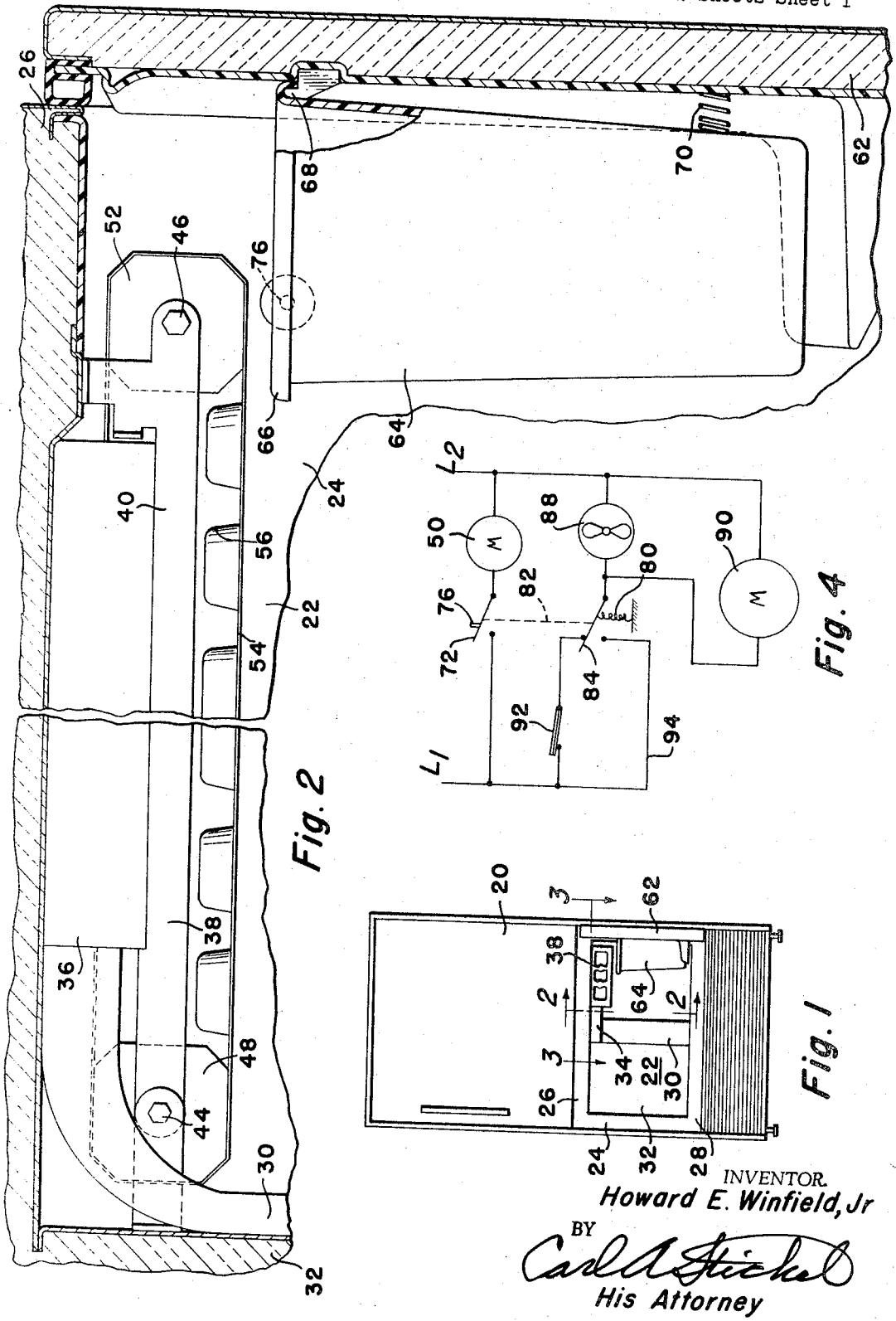

INVENTOR.
Howard E. Winfield, Jr.
BY Carl A. Tickel
His Attorney

United States Patent Office 3,308,632
Patented Mar. 14, 1967

3,308,632
ICE MAKER WITH DOOR MOUNTED BIN
Howard E. Winfield, Jr., Dayton, Ohio, assignor to General Motors Corporation, Detroit, Mich., a corporation of Delaware
Filed Dec. 28, 1964, Ser. No. 421,403
4 Claims. (Cl. 62—137)

This invention pertains to refrigerating apparatus and more particularly to automatic liquid freezers for the frozen storage compartments of household refrigerators.

Automatic liquid freezers for household refrigerators customarily have been mounted in the frozen storage compartment with a removable collecting bin beneath. The two together occupy a large proportion of the useful storage space in such compartments. Some attempts have been made to incorporate the freezing device in the refrigerator door. However difficulties have been encountered in this arrangement in that if the door is opened before the liquid is frozen, there is a possibility of liquid being carried by its own enertia out of the mold and spilled undesirably.

It is an object of this invention to mount a liquid freezer in the frozen storage compartment fastened to one of its stationary walls and to mount the collecting receptacle for the frozen cubes on the inside of the door of such a compartment where it occupies little of the useful storage space and where it is readily available for inspection and removal.

It is another object of this invention to provide a simple control arrangement upon one of the storage walls of the frozen storage compartment which will cooperate with a movable receptacle upon the door in such a way that the delivery of the frozen liquid and/or the operation of the freezer are stopped when the door is opened or when the receptacle is removed.

It is another object to provide a simple control arrangement upon one of the stationary walls of the frozen storage compartment which will cooperate with a removable resiliently mounted receptacle upon the door of such a compartment in such a way that the delivery of frozen liquid and/or the operation of the freezer are stopped when either the door is opened or the receptacle is removed or the receptacle is filled.

It is another object of this invention to provide an improved air circulating arrangement for cooling a liquid freezer of the belt type.

These and other objects are attained in the form shown in the drawings in which a belt-type ice maker is located in the upper portion of the frozen storage compartment and operated to deliver and eject the cubes or pellets of a frozen liquid over a removable receptacle resiliently mounted upon the door of such a compartment. The compartment is cooled by air at below freezing temperatures which is delivered upwardly through a duct located at the central rear of the compartment extending upwardly substantially to the top thereof and having a lateral extension provided with outlet means at the side of the ice maker which delivers the cold air around the belt for freezing the liquid therein. The ice maker is provided with a drive motor which also operates a liquid control system for delivering the liquid to be frozen in the proper amounts to the compartments in the belt.

The sidewall of the compartment adjacent the receptacle is provided with a plunger type switch having a spring pressed plunger propelled normally into engagement with the rim at the top of the removable receptacle. As long as the plunger is in engagement with the rim of the receptacle, the drive motor for the liquid freezer is connected in circuit to provide normal operation of the liquid ferezer. However when this spring pressed plunger is released, the circuit to the drive motor will be opened thereby stopping the liquid freezer. This release will occur whenever the door is opened or the receptacle is removed or whenever the receptacle is substantially completely rilled with cubes or pellets so that its rim is lowered beneath the path of the plunger when released. This provides a simple compact arrangement which conserves the useful storage space in the compartment and makes the collecting bin or receptacle readily accessible for inspection, removal and replacement.

Further objects and advantages of the present invention will be apparent from the following description, reference being had to the accompanying drawings wherein a preferred embodiment of the present invention is clearly shown.

In the drawings:

FIG. 1 is a front view of a household refrigerator with the door open to the frozen storage compartment embodying one form of my invention;

FIG. 2 is a fragmentary sectional view taken along the line 2—2 of FIG. 1;

FIG. 4 is a simplified wiring diagram for the apparatus.

Figure 3:
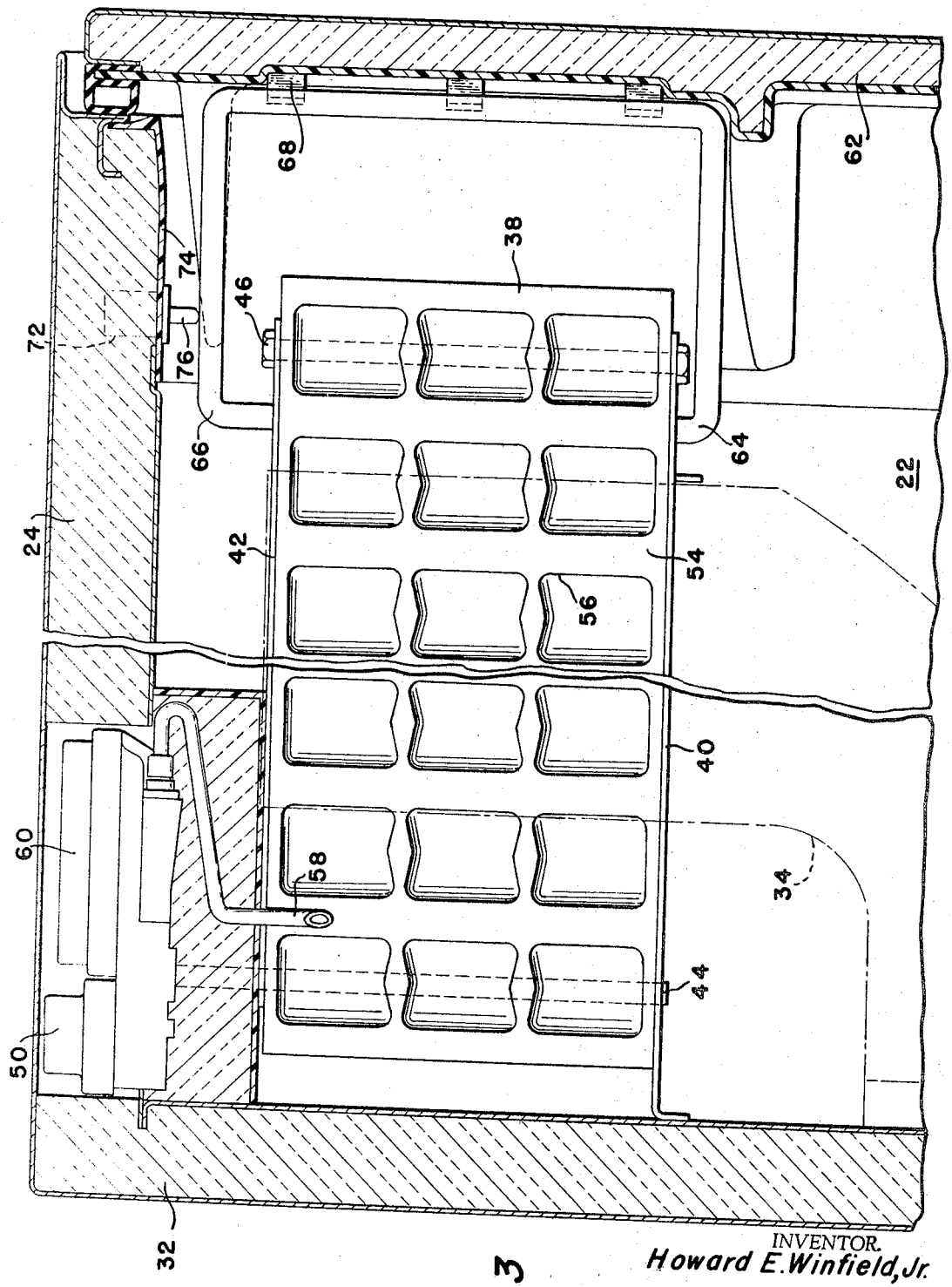
FIG. 3 is a fragmentary horizontal sectional view taken along the line 3—3 of FIG. 1.

Referring now to the drawings and more particularly to FIG. 1, there is shown a household refrigerator 20 of the frost-free type having a lower frozen storage compartment 22 enclosed by an insulated rear wall 32 and insulated side walls 24 and insulated top and bottom walls 26 and 28. The refrigerator may be similar to that shown in Patent No. 3,104,533 issued Sept. 24, 1963. As in said patent, cold air at temperatures of about 10° F. is delivered upwardly through a centrally located duct 30 adjacent the rear insulated wall 32. The top of this upwardly extending duct 30 is provided with a laterally extending discharge duct 34 having outlet means 36 discharging across the upper portion of the belt-type ice maker 38. The belt-type ice maker includes the side frames 40 and 42 which support the sprocket shafts 44 and 46.

The sprocket shaft 44 has fixed to it a sprocket 48 driven by the drive motor 50 at a relatively slow speed. The sprocket 52 is rotatably mounted upon the shaft 46. A belt 54 is mounted on the sprockets 48 and 52 and is driven at a relatively slow speed by the drive sprocket 48. The belt 54 is preferably made of a thin flexible plastic material such as polyethylene or polypropylene and has compartments or pockets 56 for the liquid to be frozen. The liquid to be frozen is delivered to the pockets 56 adjacent the rear of the compartment 22 by a supply pipe 58 through which the liquid, such as water, is supplied in measured amounts at the proper time by the liquid control device 60 driven by the drive motor 50.

The cold air delivered through the outlet means 36 around the belt freezes the liquid in the compartments 56. The sprocket 52 is provided with projections engaging the bottoms of the compartment 56 to eject the frozen liquid from the compartments at the front end of the freezer. The frozen storage compartment 22 is provided with an insulated door 62 upon which is mounted beneath the sprocket 52 a removable plastic receptacle 64 having a curled upper rim 66. The collecting receptacle 64 is resiliently supported by having its rim hooked over three upwardly extending plastic projections 68 fastened to the inner face of the door 62 and extending upwardly beneath the rim 66. The resilient support for the receptacle 64 is completed by a light coil spring 70 located between the back of the receptacle 64 and the inner surface of the door 62.

With this arrangement the receptacle 64 can be readily removed whenever the door 62 is opened merely by lifting it off the projections 68. It is also easily replaced by hooking the rim 66 over the upwardly extending projections 68 and allowing its adjacent wall to rest against the spring 70. As the receptacle 64 is filled, it will gradually pivot downwardly more and more about the projections 68 against the spring 70 to compress the spring 70 a distance proportional to the loading of the receptacle. This resilient mounting arrangement is taken advantage of as a means for detecting when the collecting receptacle 64 is substantially filled with frozen liquid.

According to my invention, the one side wall 24 is provided with a plunger switch 72 mounted therein behind the plastic breaker strip 74. This switch 72 has an operating plunger 76 having spring operated projecting means within the switch which tends to project the plunger 76 outwardly. The switch 72 may include one or more switches of either the single pole or double throw type. The plunger 76 is aligned with the rim 66 of the receptacle 64 when the receptacle 64 is less than substantially filled. The presence of the receptacle 64 in its normal position on the door will normally hold the plunger 76 in its normal inner position by presenting its rim 66 as an obstacle to the outward movement of the plunger 76. However, when the receptacle 64 is filled with cubes or pellets, it will pivot downwardly to bring its rim 66 beneath the plunger 76, to allow the switch 72 to open. This also happens when the receptacle 64 is removed.

In the wiring diagram shown in FIG. 4 the drive motor 50 is shown connected in series with the switch 72 across the supply conductors L1 and L2. The operating plunger 76 is indicated diagrammatically. In the outward position of the plunger 76, the switch 72 is in the open circuit position thereby deenergizing the drive motor 50. The switch 72 is propelled to the open position by a suitable spring 80. As shown in the wiring diagram of FIG. 4, there may also be connected through the linkage 82 to the switch 72 a double throw switch 84 which is shown connected in series with a motor driven fan 88 which may be used to circulate the cold air upwardly through the duct 30 and also a compressor motor 90 which may drive the refrigerating system to cool the air conducted by the duct 30. The fan 88 and the motor 90 are in parallel circuit with each other. The double throw switch 84 in one alternate position (which is concurrent with the open position of the switch 72) connects through a thermostat 92 with the supply conductor L1. In the alternate position, the double throw switch 84 connects through a shunt 94 with the supply conductor L1. This second position is concurrent with the closed position of the switch 72. This arrangement assures that the refrigerating system operated by the motor 90 and the motor driven fan 88 will operate continuously whenever the liquid freezer is in operation. When the liquid freezer is not in operation, the motor 90 and the motor driven fan 88 will operate under the control of the thermostat 92 which may be placed in one of the storage compartments of the refrigerator to prevent overcooling.

With this arrangement, the collecting receptacle 64 will allow frozen food to be placed in the space beneath the liquid freezer. The receptacle 64 takes only a small amount of space at the front of the freezer adjacent the door 62 so that a large proportion of the space in the compartment 22 remains for frozen storage. The receptacle 64 is always accessible by the opening of the door 62. The plunger type control 76 is simple and reliable and does not require any electrical connections with the door 62. It also does not interfere with the removal and replacement of the receptacle 64. In this way a very desirable ice making arrangement is provided which occupies a minimum of the useful storage space of the frozen storage compartment.

While the embodiment of the present invention as herein disclosed, constitutes a preferred form, it is to be understood that other forms might be adopted.

What is claimed is as follows:
1. Refrigerating apparatus including insulated walls and a door enclosing a freezing compartment, a liquid freezer mounted in said compartment connected to one of said walls, a collecting receptacle mounted on said door, said door being provided with a resilient mounting for resiliently supporting said receptacle, means for supplying liquid to be frozen to said freezer, said freezer having means for freezing said liquid and discharging the frozen liquid into said receptacle, said receptacle being provided with a rim, one of said walls being provided with a control means having a spring pressed operating means aligned with and normally held by the rim of the receptacle when the receptacle is less than full and which extends above the rim of the receptacle in response to deflection of said receptacle upon its resilient mounting for stopping the discharging of the frozen liquid into said receptacle.

2. Refrigerating apparatus including insulated walls and a door enclosing a freezing compartment, a liquid freezer mounted in said compartment connected to one of said walls, a collecting receptacle mounted on said door, said door being provided with a resilient mounting for resiliently supporting the receptacle, means for supplying liquid to be frozen to said freezer, said freezer having means for freezing said liquid and discharging the frozen liquid into said receptacle, said receptacle being provided with a projection, one of said walls being provided with a control means having a spring pressed operating means aligned with and normally held by said projection when the receptacle is less than full and which extends above the projection when the receptacle is deflected upon its resilient mounting for stopping the discharging of the frozen liquid into said receptacle.

3. Refrigerating apparatus including insulated walls and a door enclosing a freezing compartment, a liquid freezer mounted in said compartment connected to one of said walls, a removable collecting receptacle removably mounted on said door, means for supplying liquid to be frozen to said freezer, said freezer having means for freezing said liquid and discharging the frozen liquid into said receptacle, one of the walls of said freezing compartment being provided with a control means having means cooperating with said receptacle and responsive individually to the absence of the receptacle and the opening of said door for stopping the discharge of the frozen liquid by the freezer.

4. Refrigerating apparatus including insulated walls and a door enclosing a freezing compartment, a liquid freezer mounted in said compartment connected to one of said walls, a collecting receptacle mounted on said door, means for supplying liquid to be frozen to said freezer, said freezer having means for freezing said liquid and discharging the frozen liquid into said receptacle, one of the walls of said compartment being provided with control means having an operating device provided with a projecting spring for normally holding said device in contact with said receptacle, said control means having means effective when said device is in the position held by said receptacle for causing operation of said freezer, said last means being effective when said device is not held by said receptacle for preventing the discharge of the frozen liquid by the freezer.

References Cited by the Examiner

UNITED STATES PATENTS

| | | | |
|---|---|---|---|
| 2,487,408 | 11/1949 | Askin | 62—345 X |
| 2,891,385 | 6/1959 | Nelson | 62—137 |
| 2,994,205 | 8/1961 | Brubaker et al. | 62—137 X |
| 3,025,682 | 3/1962 | Kniffin | 62—340 |
| 3,089,312 | 5/1963 | Harle | 62—344 |
| 3,163,019 | 12/1964 | Hall | 62—137 |
| 3,199,309 | 8/1965 | Brubaker | 62—345 |

ROBERT A. O'LEARY, *Primary Examiner.*

W. E. WAYNER, *Assistant Examiner.*